(12) United States Patent  
Young et al.

(10) Patent No.: US 8,444,295 B2  
(45) Date of Patent: May 21, 2013

(54) OPTICAL SYSTEM FOR THEATRICAL AND STAGE LIGHTING

(75) Inventors: Garrett J. Young, Sully, IA (US); Andrew Stangeland, Oskaloosa, IA (US)

(73) Assignee: Prism Projection, Inc., Sully, IA (US)

( * ) Notice: Subject to any disclaimer, the term of this patent is extended or adjusted under 35 U.S.C. 154(b) by 309 days.

(21) Appl. No.: 12/794,384

(22) Filed: Jun. 4, 2010

(65) Prior Publication Data

US 2010/0309665 A1    Dec. 9, 2010

Related U.S. Application Data

(60) Provisional application No. 61/184,517, filed on Jun. 5, 2009.

(51) Int. Cl.
*F21V 5/00* (2006.01)

(52) U.S. Cl.
USPC ................................ 362/235; 362/249.02

(58) Field of Classification Search
USPC ............................... 362/235, 249.02, 249.05
See application file for complete search history.

(56) References Cited

U.S. PATENT DOCUMENTS 6,364,487 B1 *  4/2002  Weber et al. .................... 353/30
6,542,307 B2 *  4/2003  Gleckman et al. ............ 359/638

* cited by examiner

*Primary Examiner* — David V Bruce
(74) *Attorney, Agent, or Firm* — Schwegman Lundberg & Woessner, P.A.

(57) ABSTRACT

Various optical system embodiments produce a narrow beam of focused or unfocused light using a compound parabolic concentrator, lens system, and high flux density solid-state light source. Various system embodiments include a solid state light source configured to emit light, and a compound parabolic concentrator having a smaller opening and a larger opening opposite the smaller opening, wherein the light source and the concentrator are operationally positioned with respect to each other for light from the light source to enter the smaller opening of the concentrator and exit the larger opening of the concentrator as a narrower beam of light. Some embodiments include an imaging stage operationally positioned with respect to the concentrator to receive the narrower beam of light at an image plane and relay an image plane to a far field target.

28 Claims, 6 Drawing Sheets

OPTICAL SYSTEM FOR THEATRICAL AND STAGE LIGHTING

CROSS REFERENCE TO RELATED APPLICATIONS

This application claims the benefit of U.S. Provisional Application No. 61/184,517, filed on Jun. 5, 2009, under 35 U.S.C. §119(e), which is hereby incorporated by reference in its entirety.

TECHNICAL FIELD

This application relates generally to optical systems, and more particularly to optical systems for theatrical and stage lighting fixtures.

BACKGROUND

Optical systems for theatrical and stage lighting fixtures are generally intended to capture light from a light source that emits light over a wide angle and produce a narrower beam of focused or unfocused light. Existing optical systems used in related fields include ellipsoidal reflectors in combination with aspheric lenses and parabolic reflectors optionally in combination with Fresnel lenses.

In general, the optical systems are composed of illumination and imaging stages. The illumination stage is comprised of a light source and optical component(s) that gather the light into a narrower converging or diverging beam. The imaging stage has one or more elements that relay an image plane to a far-field target. The effectiveness of these systems is a function of the etendue of the light source and the limits of aperture and acceptance angle of the subsequent optical components.

State of the art architectural theatrical and stage lighting fixtures employ conventional light sources such as gas-discharge or incandescent lamps. Typically the etendue of a conventional light source at a given level of luminous flux is significantly better than light emitting diodes (LED), but conventional light sources have drawbacks such as lower luminous efficacy, shorter operating lifetime, and less robust package. Thus, there is a need for an optical system that overcomes the etendue limitations of an LED for effective application.

SUMMARY

Various optical system embodiments produce a narrow beam of focused or unfocused light using a compound parabolic concentrator, lens system, and high flux density solid-state light source.

Various system embodiments include a solid state light source configured to emit light, and a compound parabolic concentrator having a smaller opening and a larger opening opposite the smaller opening, wherein the light source and the concentrator are operationally positioned with respect to each other for light from the light source to enter the smaller opening of the concentrator and exit the larger opening of the concentrator as a narrower beam of light.

According to various method embodiments for projecting light, at least one solid state device is used to emit a light, and a compound parabolic concentrator is used to concentrate the light from the wide angle to a narrower angle.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
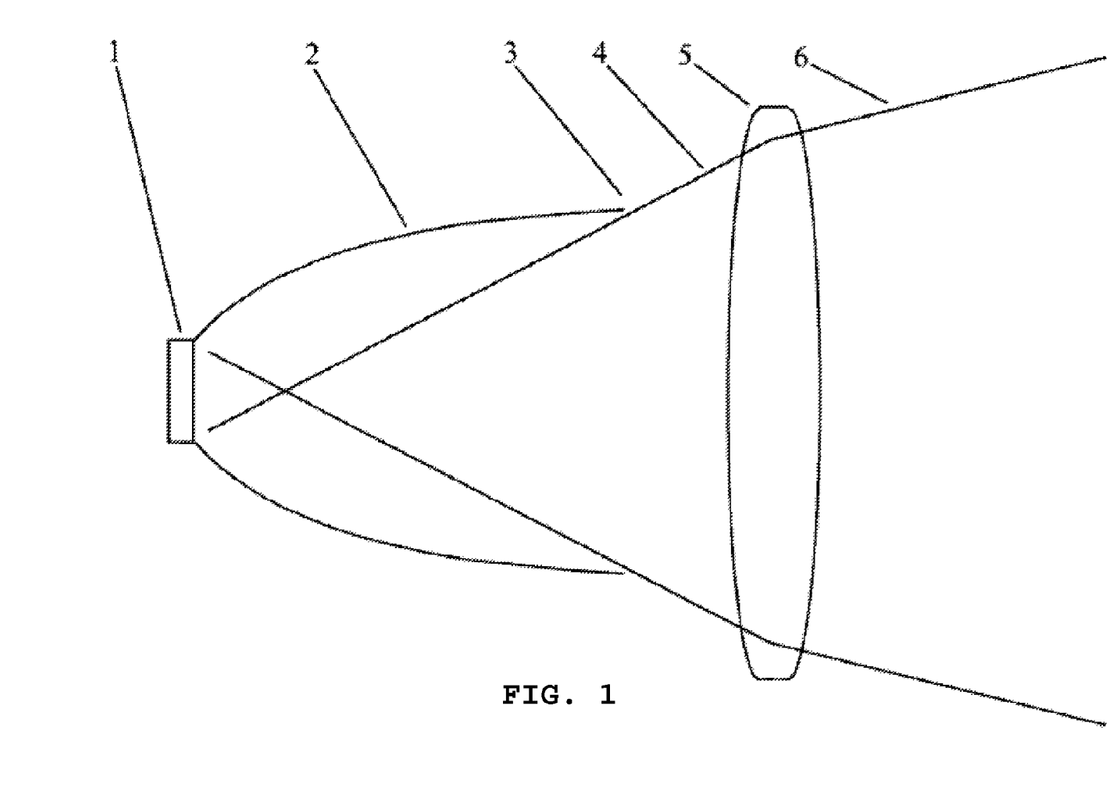
FIG. 1 illustrates a side-view of the optical elements of a focusable embodiment.
Figure 2:
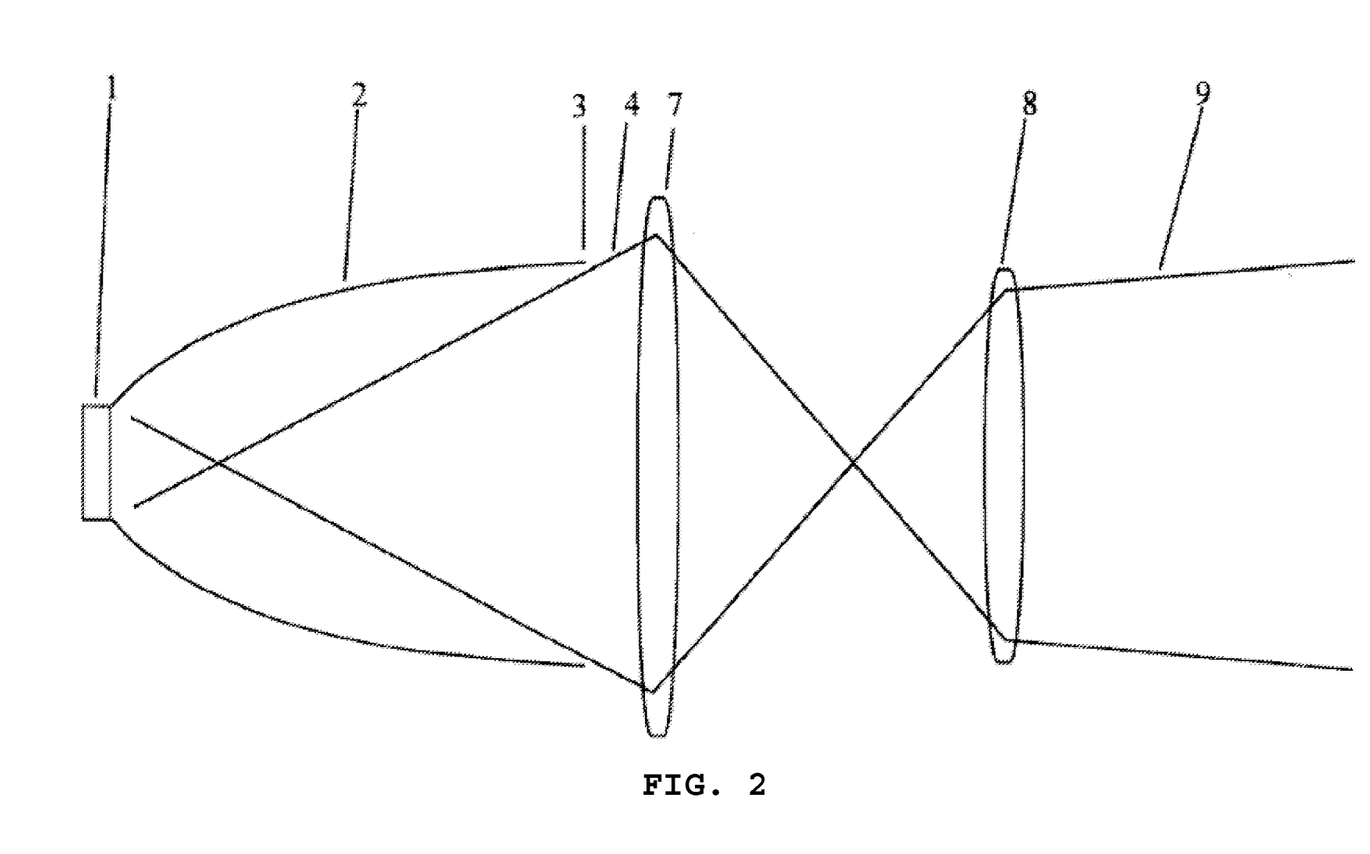
FIG. 2 illustrates a side-view of the optical elements of a non-focusable embodiment.
Figure 3:
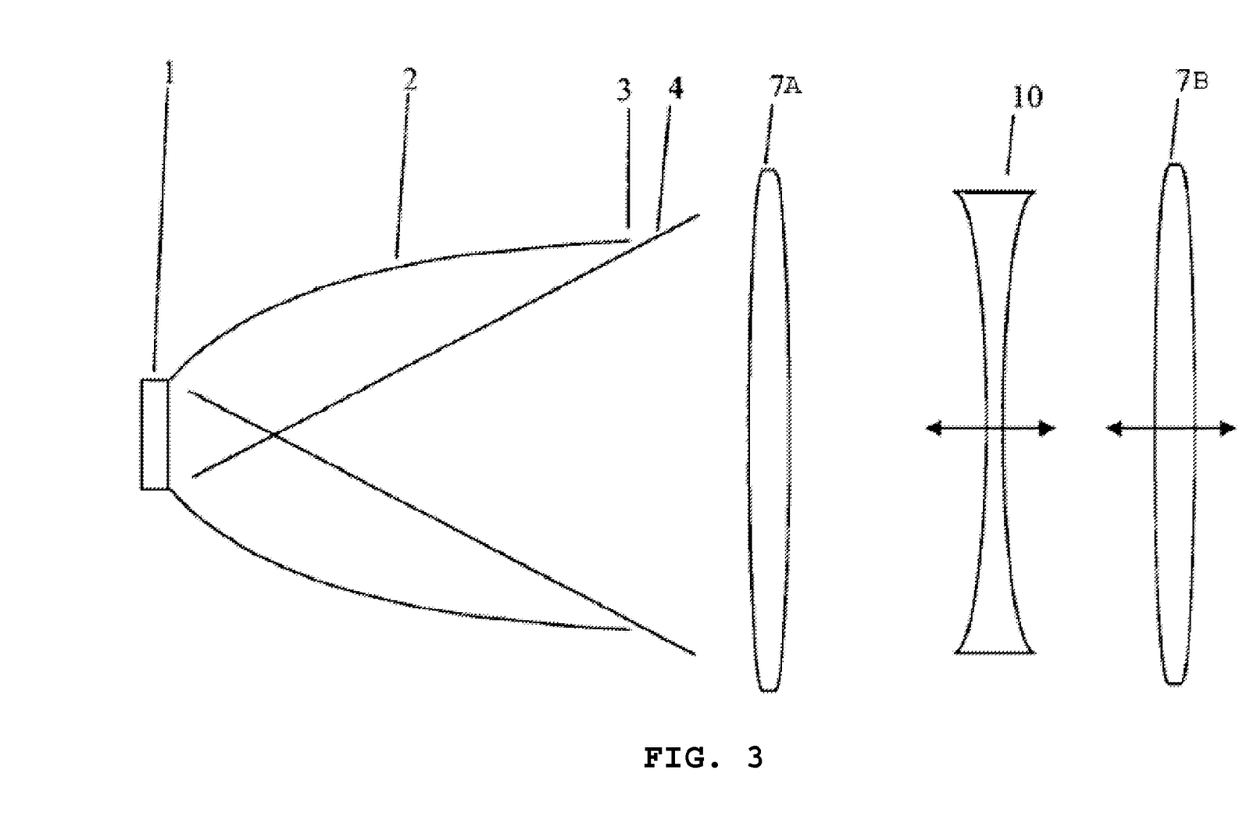
FIG. 3 illustrates a side-view of the optical elements of a focusable zoom embodiment.

FIGS. 1, 2, and 3 show a light source 1 with a wide emitting angle placed in such a way that its output enters the smaller opening of a truncated compound parabolic concentrator (CPC) 2, also known as a Winston cone. The light exits the CPC 2 through the output aperture 3. The CPC 2 produces a narrowed beam of light 4.

In FIG. 1 an imaging lens 5 captures the narrowed beam of light 4 and a focused beam of light 6 is produced. An aperture outline image or moveable shutters can be placed at the image plane in order to be projected onto the stage. The projection lens assembly, in its simplest form, can be a single positive spherical element or, for a more elaborate higher-performance arrangement, color- and distortion-corrected achromatic aspheres. The optical elements can be constructed using the Fresnel technique in order to minimize thickness and weight.

In FIG. 2 the narrowed beam of light 4 is captured by the first lens 7 then passed to the second lens 8. These two lenses 7 and 8 form a magnification system that changes the beam angle without actually focusing it.

Figure 5:
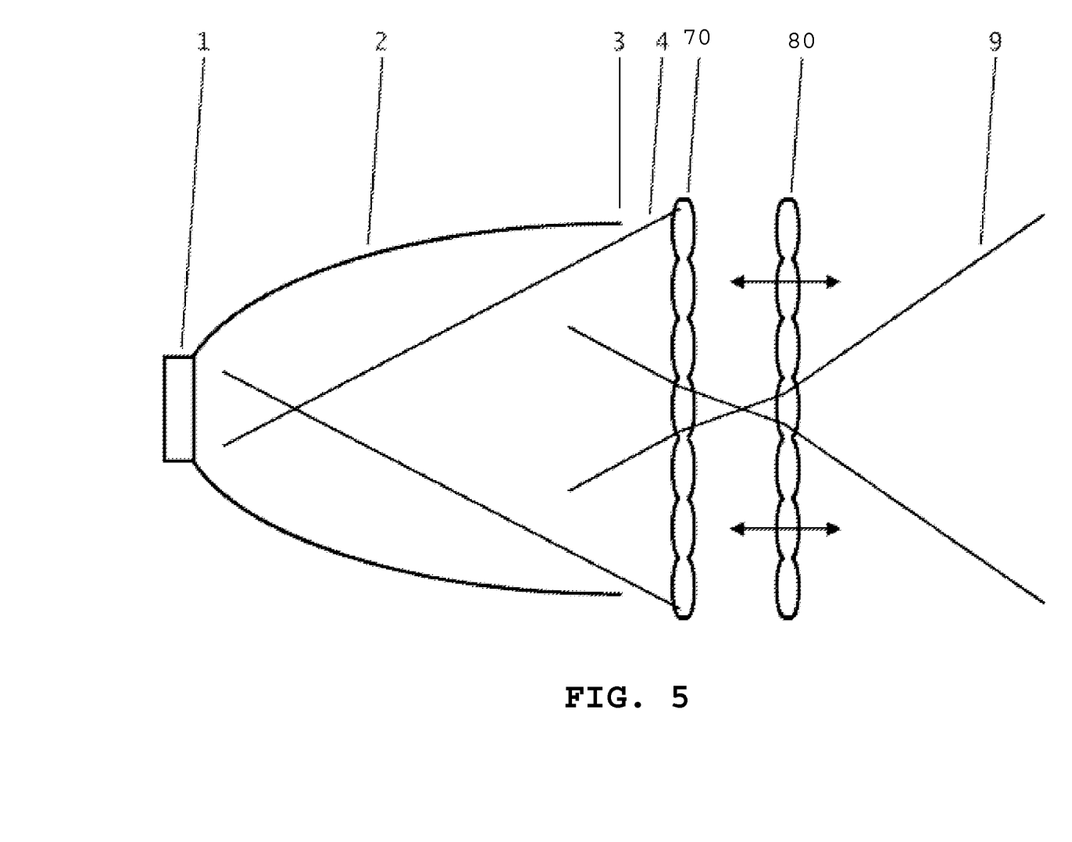
FIG. 5 illustrates an embodiment, similar to FIG. 2, except that two lenslet arrays are used to widen the output angle.

In FIG. 5 two lenslet arrays 70 and 80 are used to widen the output angle by a variable amount. The first lenslet array 70 captures light from every angle the CPC 2 emits. Then the second lenslet array 80 receives the light from the corresponding lenslets in the first array 70 and reshapes the beam with a new output angle. The final output angle can be varied, by spatially adjusting the position of the second lenslet array 80. The lenslet size, focal length, and maximum distance between the lenslet arrays 70 and 80 are selected so that the rays emitted from a lenslet in the first array 70 do not expand so much that they spread into adjacent lenslets of the second array 80, or those rays will be scattered.

In FIG. 3 a Cooke triplet projection zoom lens assembly receives light from CPC 2 and creates a focused beam of variable output angle. The Cooke triplet consists of two positive elements 7A and 7B that are usually equal in focal length and a center negative element 10 made from a higher dispersion material that has less than half the focal length of the other two lenses 7A and 7B. The center and field adjacent elements 7A, 7B and 10 are spatially adjusted to vary the output angle while maintaining the back focal plane. A Cooke triplet design is capable of correcting all of the seven Sidel aberrations over a wide field of view.

Figure 6:
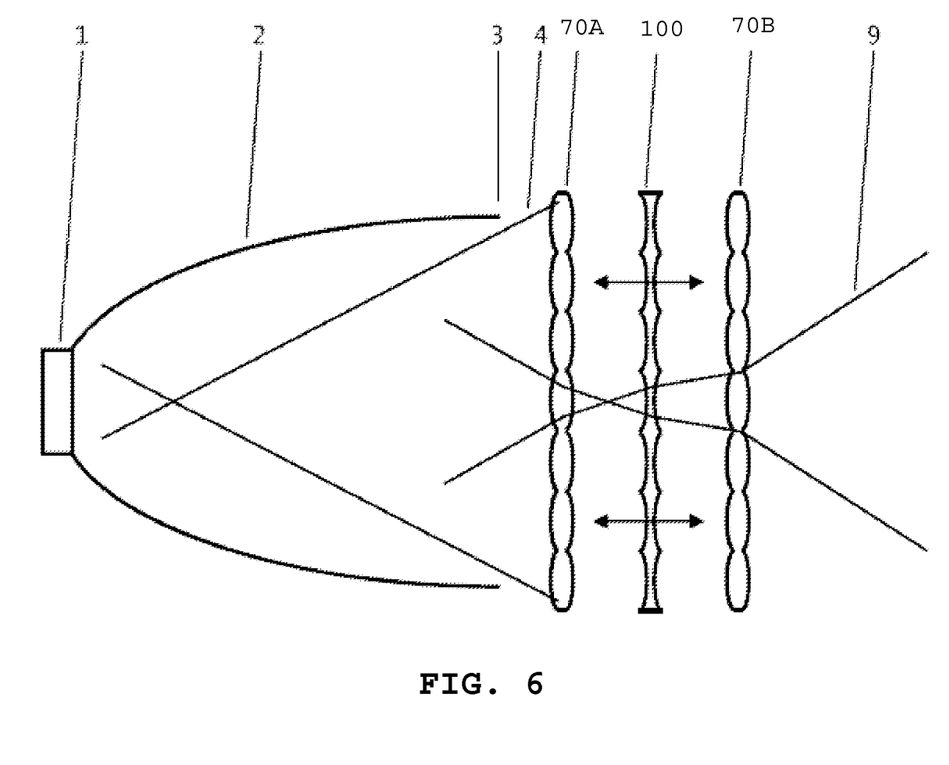
FIG. 6 illustrates an embodiment, similar to FIG. 2, except that the Cooke triplet is accomplished a non-imaging manner using two positive lenslet arrays and a negative lenslet array positioned between the two positive lenslet arrays.

In FIG. 6 the same Cooke triplet is accomplished in a non-imaging manner using three lenslet arrays 70A, 70B and 100 in place of each of the three lenses 7A, 7B and 10 from FIG. 3. The positive lenslet arrays 70A and 70B and the negative lenslet array 100 work in much the same way as FIG. 3. Except that with the first lenslet array 70A receives rays from every angle the CPC 2 emits all the way out to the edge of each lenslet, and each of the following lenslet arrays 100 and 70B are placed close enough that the rays from each lenslet in the first lenslet array 70A do not expand into adjacent lenslets of the following array 100 and 70B or those rays will be scattered. Using non-imaging lenslet in place of full-sized imaging lens has the advantage of further homogenizing the light.

Figure 4:
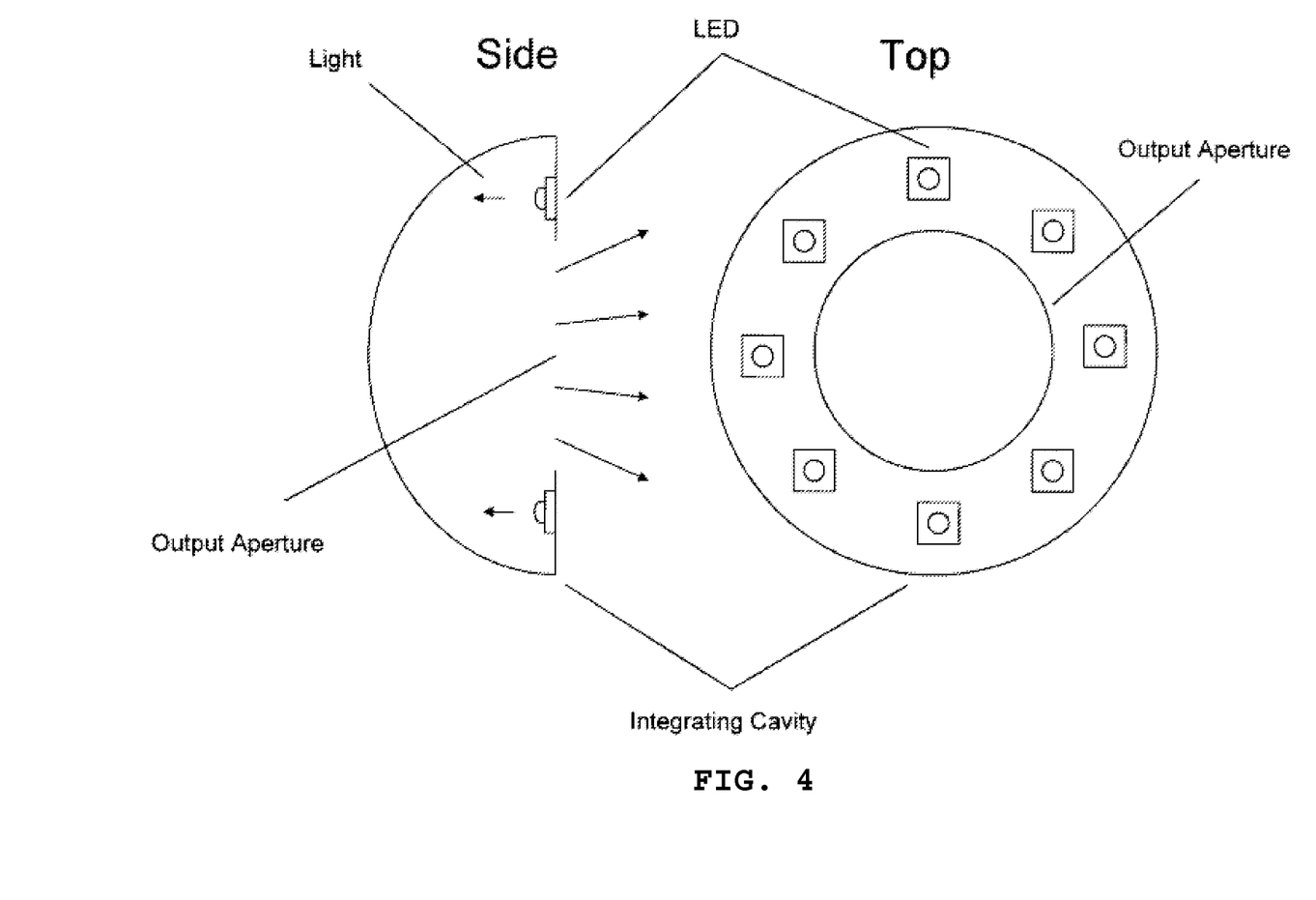
FIG. 4 illustrates an embodiment of a solid state light source, including a hemispherical cavity with diffuse reflection characteristics placed over a circular array of discrete LEDs and a concentric opening opposite the dome and LED output vector.

An embodiment provides a homogenous and high flux density, i.e. low etendue, solid-state light source. One way to achieve this goal uses an integrating cavity that has diffuse or specular reflection properties such that a plurality of LEDs can be arranged such that they share a common output. An example of this approach is a hemispherical cavity with diffuse reflection characteristics placed over a circular array of discrete LEDs and a concentric opening opposite the dome and LED output vector, as shown in FIG. 4. Another way to achieve this goal is to package the raw chips in close proximity on a common or limited number of substrates. An example of this method is a product provided by Enfis (the Quatro Array) or Luminous Devices, Inc. (part number CBM-380 or CBM-360-W).

CPC reflectors are generally used in reverse to take narrow-angle solar rays in the larger opening and concentrate them into a smaller output area. However if a light source with a wide emitting angle is placed at the smaller opening, the CPC reflector narrows the beam to be no wider than a fixed angle. A CPC reflector is designed by tilting a parabola by a chosen angle then revolving the curve. The angle by which the parabola is tilted is the same as the angle of the beam that the CPC reflector will create. There are two competing goals in choosing the angle: creating the narrowest beam of light, and minimizing the size of the optical system. For smaller angles, CPC will create narrower beams of light, but require a larger output diameter and a longer reflector. However, because CPC reflectors are non-imaging optical elements, they are capable of producing a narrower beam than a parabolic or elliptical reflector with the same output diameter. CPC efficiency is equal to the thermodynamic limit of maximum efficiency. The non-imaging nature of a CPC mixes the output so that non-uniformity in the light source is smoothed instead of being re-imaged, unchanged, in the output. Using a CPC reflector to narrow a beam of light for theatrical and stage lighting represents an innovative enhancement over the current technology.

The CPC 2 is a non-imaging optical element. Therefore, the illuminated area will have a soft edge, meaning there will be a low contrast transition from light to dark. In many cases the blended transition or soft edge is desirable and if this is the user's goal, then no lens system is necessary. However it is often desirable to either have a high contrast transition from light to dark (a "hard" edge) or to be able to shape the light. Typically one might try to image the light source 1, but the CPC 2 scatters the image of the light source 1 so it cannot be recovered. Instead the CPC output aperture 3 is used as the image plane. A lens 5 can be placed so that its primary image focal plane coincides with the CPC output aperture 3, which will create a "hard" edged, focused area which mimics the output aperture 3's appearance. The beam of light 4 exiting the CPC 2 is diverging. Therefore, the effective diameter of the imaging lens 5 needs to increase proportionally to the distance from CPC 4. A low F/# lens, short focal length with relatively large diameter, reduces the overall size of the system; however, it will increase the beam angle, so it is important to balance the location and focal length of the lens to create the desired beam. Fresnel lenses often have low F/# numbers and due to their construction are relatively thin and lightweight. The thin and lightweight nature of Fresnel lenses makes them more conducive to be used in combinations of two or more in order to achieve specific properties.

An example system is a CPC 2 with a 14° half angle, having a lambertian light source 1 with a circular opening approximately 4 cm in diameter. Using the Winston cone equations:

$$a = a'/\sin\theta$$

$$L = (a + a')\cot\theta$$

Substituting the radius of the lambertian light source 1 for a' and the half angle of the beam of light 4 for θ allows us to solve for a, output aperture 3, and L, the length of the CPC 2.

$$a = 2 \text{ cm}/\sin 14° \approx 8.27 \text{ cm}$$

$$L = (8.27 \text{ cm} + 2 \text{ cm})\cot 14° \approx 41.19 \text{ cm}$$

The CPC 2 is calculated to be approximately 41.19 cm long with an output aperture 3 diameter of 16.54 cm. The surface profile of the CPC 2 is defined by the following Winston cone equation:

$$y(\phi) = \frac{2f\sin(\phi - \theta_{max})}{1 - \cos\phi} - a', \quad z(\phi) = \frac{2f\cos(\phi - \theta_{max})}{1 - \cos\phi},$$

where f=a' (1+sin $\theta_{max}$). This system produces a "soft" edge without a lens and creates a very smooth, uniform output over the illuminated area. If two #56 Fresnel lenses, having conical profile ridges with a 32.7 cm diameter and a focal length of 61 cm, from Fresnel Technologies, Inc. are spaced 3 cm apart, the back focal length is reduced to 31 cm. The selection of a 31 cm focal length allows the beam angle to remain approximately the same. The lens assembly is then placed at a distance of 31 cm from the output aperture 3, which produces a hard edge, infinitely-focused image. If shutters or outline profiles cover sections of the output aperture 3, the area illuminated will correspond to the interrupted output aperture 3.

A dramatically reduced overall size of the optical system can be achieved when the CPC is designed for an output half angle of 30° or 45° and a lens with a comparable diameter to the previous example is placed at a shorter distance from the output aperture. In addition to smaller dimensions, the final output beam 6 can easily be reduced to half angles smaller than 14°.

Using a CPC without a lens is acceptable for many applications where a "hard" edge is not required, as long as the beam angle is narrow enough for the application. However, as beam full angles become narrower than 10° or 15°, the CPC quickly becomes too large to be considered an acceptable solution. Instead a wider beam angle is selected for the CPC design and two magnifying lenses 7 and 8 are used to narrow the beam to the desired angle. The first magnifying lens 7 can be placed near the output aperture 3, since it does not need to image or focus anything. The second magnifying lens 8 is a less powerful lens that is placed so that its focal point is in the same position as the focal point of the first magnifying lens 7. This non-imaging lens system reduces the beam angle by the ratio of focal lengths between the first 7 and second 8 lenses. Similar to the single lens system, the lens diameter and the overall length tend to decrease as the CPC angle is increased. Again a CPC half angle such as 30° or 45° seems to be ideal for minimizing system size.

Another embodiment of the present invention is to utilize an array of CPC elements aligned with a corresponding array of LEDs in conjunction with the secondary optical systems disclosed in the figures.

FIG. 1, FIG. 2, and FIG. 3 illustrate some examples of lens arrangements that take advantage of the ability of the CPC 2 to efficiently narrow the beam angle of light emitted from a wide angle light source 1. Many other variations of imaging and non-imaging lensing systems can potentially be used in place of the systems already described. For example, zoom lenses, shift lenses, anamorphic lenses, achromat lenses and any number of other types of lenses could be used in place of or in conjunction with either the imaging lens 5 or the magnifying lenses 7 and 8.

The above detailed description is intended to be illustrative, and not restrictive. The scope of the invention should, therefore, be determined with reference to the appended claims, along with the full scope of equivalents to which such claims are legally entitled.

What is claimed is:

1. A system, comprising:
    a solid state light source configured to emit light;
    a compound parabolic concentrator having a smaller opening and a larger opening opposite the smaller opening, wherein the light source and the concentrator are operationally positioned with respect to each other for light from the light source to enter the smaller opening of the concentrator and exit the larger opening of the concentrator as a narrower beam of light; and
    an imaging stage operationally positioned with respect to the concentrator to receive the narrower beam of light at an image plane and relay an image plane to a far field target, wherein the imaging stage includes two positive lenslet arrays and one negative lenslet array positioned between the two positive lenslet arrays.

2. The system of claim 1, wherein the imaging stage includes a single lens to focus the narrower beam of light from the concentrator.

3. The system of claim 1, wherein the imaging stage includes a magnifying lens system.

4. The system of claim 1, wherein the imaging stage includes a zoom lens.

5. The system of claim 1, wherein the imaging stage includes a shift lens.

6. The system of claim 1, wherein the imaging stage includes an anamorphic lens.

7. The system of claim 1, wherein the imaging stage includes an achromat lens.

8. The system of claim 1, wherein the imaging stage further includes an imaging lens to focus the narrow beam of light from the concentrator or a magnifying lens.

9. The system of claim 1, wherein the imaging stage includes a lenslet array.

10. The system of claim 1, wherein the light source includes a plurality of LEDs configured to share a common output.

11. The system of claim 10, wherein the light source includes a hemispherical cavity placed over the plurality of LEDs, and wherein the hemispherical cavity includes a concentric opening.

12. The system of claim 11, wherein the light source includes raw chips in close proximity on a common or limited number of substrates.

13. A method for projecting light, comprising:
    using at least one solid state device to emit a light, wherein using at least one solid state device includes using a hemispherical cavity placed over a plurality of LEDs; and
    concentrating the light to a narrower angle using a compound parabolic concentrator.

14. The method of claim 13, further comprising focusing the light with the narrower angle using an imaging lens.

15. The method of claim 13, further comprising passing the light with the narrower angle through a magnifying lens.

16. The method of claim 13, further comprising relaying an image plane to a far field target.

17. The method of claim 13, wherein using at least one solid state device includes using a light source on raw chips on a common or limited number of substrates.

18. A system, comprising:
    a solid state light source configured to emit light, wherein the light source includes a plurality of LEDs configured to share a common output, wherein the light source includes a hemispherical cavity placed over the plurality of LEDs, and wherein the hemispherical cavity includes a concentric opening; and
    a compound parabolic concentrator having a smaller opening and a larger opening opposite the smaller opening, wherein the light source and the concentrator are operationally positioned with respect to each other for light from the light source to enter the smaller opening of the concentrator and exit the larger opening of the concentrator as a narrower beam of light.

19. The system of claim 18, further comprising an imaging stage operationally positioned with respect to the concentrator to receive the narrower beam of light at an image plane and relay an image plane to a far field target.

20. The system of claim 19, wherein the imaging stage includes a single lens to focus the narrower beam of light from the concentrator.

21. The system of claim 19, wherein the imaging stage includes a magnifying lens system.

22. The system of claim 19, wherein the imaging stage includes a zoom lens.

23. The system of claim 19, wherein the imaging stage includes a shift lens.

24. The system of claim 19, wherein the imaging stage includes an anamorphic lens.

25. The system of claim 19, wherein the imaging stage includes an achromat lens.

26. The system of claim 19 wherein the imaging stage further includes an imaging lens to focus the narrow beam of light from the concentrator or a magnifying lens.

27. The system of claim 19, wherein the imaging stage includes a lenslet array.

28. The system of claim 19, wherein the light source includes a plurality of LEDs configured to share a common output, wherein the light source includes raw chips in close proximity on a common or limited number of substrates.

* * * * *